Figure 1:
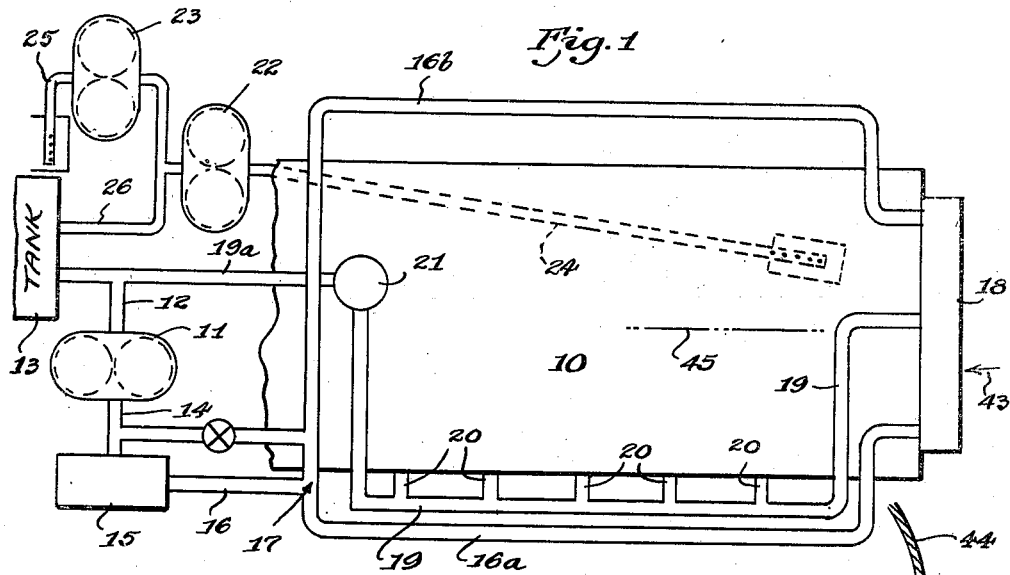

Jan. 25, 1944.  C. I. PRESTON  2,339,805
ENGINE LUBRICATION SYSTEM
Filed Nov. 22, 1940  3 Sheets-Sheet 1

INVENTOR.
Charles I. Preston
Attorney

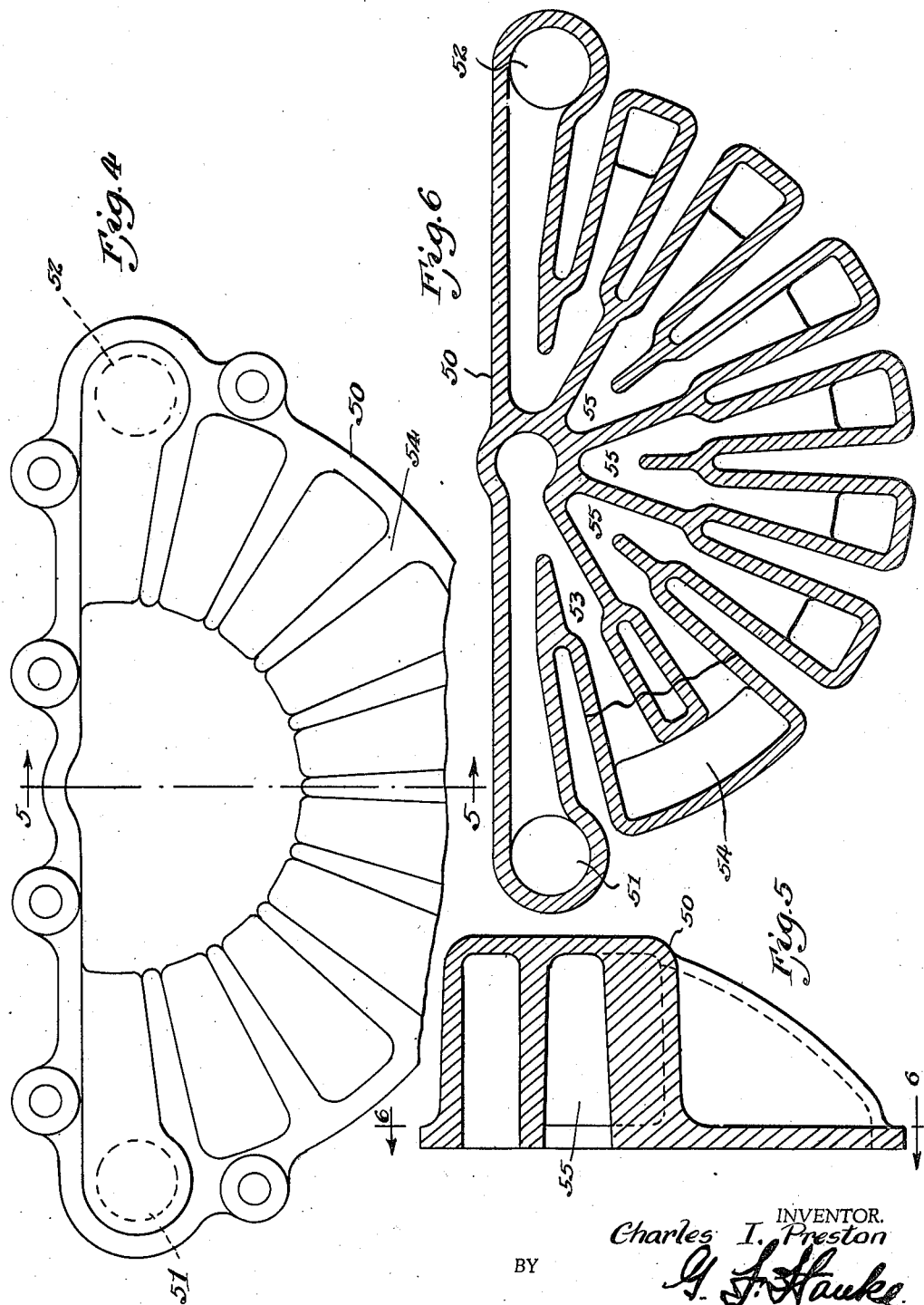

Jan. 25, 1944.   C. I. PRESTON   2,339,805
ENGINE LUBRICATION SYSTEM
Filed Nov. 22, 1940   3 Sheets-Sheet 3
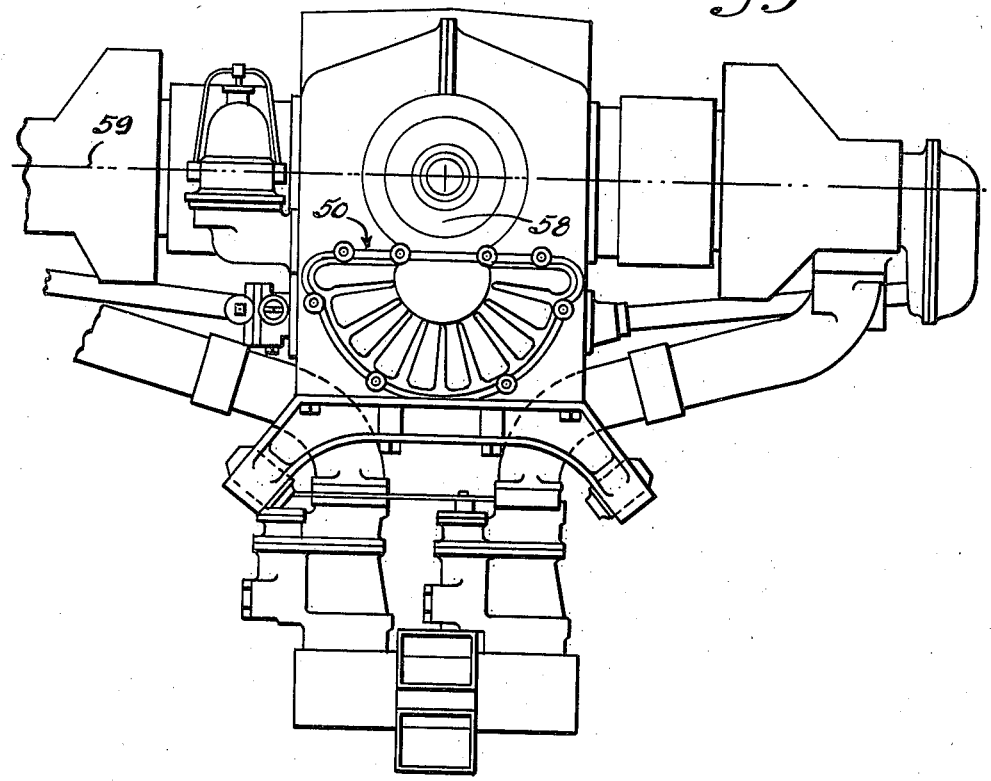
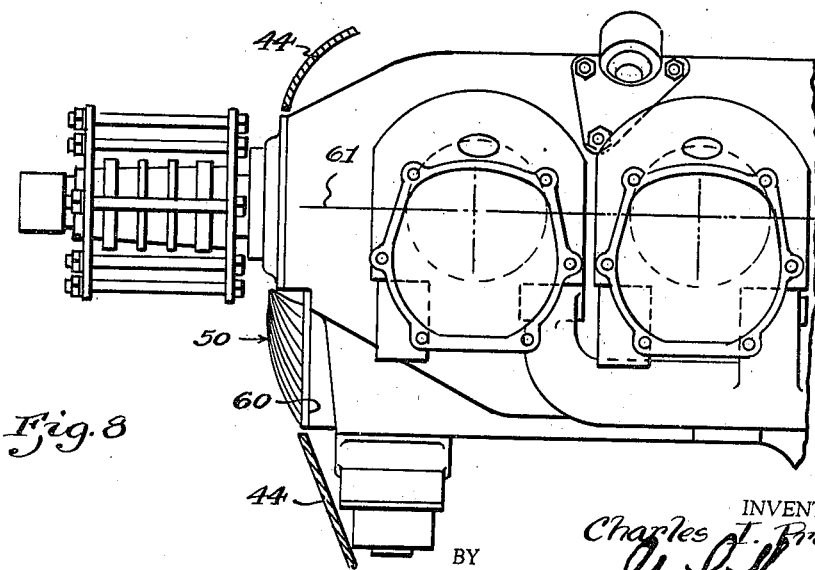
INVENTOR.
Charles I. Preston
BY
Attorney Patented Jan. 25, 1944

2,339,805

UNITED STATES PATENT OFFICE 2,339,805

ENGINE LUBRICATION SYSTEM

Charles I. Preston, Muskegon, Mich., assignor to Continental Motors Corporation, Detroit, Mich., a corporation of Virginia Application November 22, 1940, Serial No. 366,581

5 Claims. (Cl. 184—104)

My invention relates to an oil pressure lubrication system for an aircraft internal combustion engine, and more particularly relates to the general assembly of the lubrication system and to the oil cooler assembly and specific construction of same.

It will be noted that the present improved oil pressure lubrication system is particularly applicable to an aircraft engine having horizontally opposed aligned cylinders. In this connection it may be observed that in aircraft engines of this type, it is somewhat difficult to construct an efficient and satisfactory lubrication system embodied as a unitary assembly with the engine, this probably being more particularly difficult when endeavoring to provide satisfactory oil cooling means.

An object of my present invention is to improve engine performance by providing an improved oil pressure lubrication system therefor which is self contained and substantially directly assembled to form a unitary assembly with the engine.

Another object of my invention is to improve the performance and operating characteristics of an aircraft internal combustion engine of the aligned cylinder type by providing an improved oil pressure lubrication system including an oil cooler, and in which substantially all the engine parts to be lubricated are connected with the lubrication system in such a way as to feed lubricating oil to said engine parts to be lubricated subsequent to the flow of said oil through the oil cooler.

Still another object of my invention is to improve engine performance by providing an engine lubrication system suitable for an aircraft engine in which an oil cooler is secured directly to the engine structure adjacent the front end thereof, and which is constructed to lie substantially flush with the surface of the cowling structure enclosing said engine, and which is further arranged to face the air stream induced to flow towards the engine by the engine driven propeller.

A further object of my present invention is to improve engine performance and general operating conditions by providing a pressure lubrication system embodying an air cooler comprising a structure directly secured to the engine and having inlet and outlet ports registering with openings which communicate directly with the internal oil ducts in the engine.

Still further objects of my present invention relate to various features and detail of construction of the oil cooler assembly per se and to the general arrangement of the oil cooler assembly relative to the engine structure.

Figure 2:
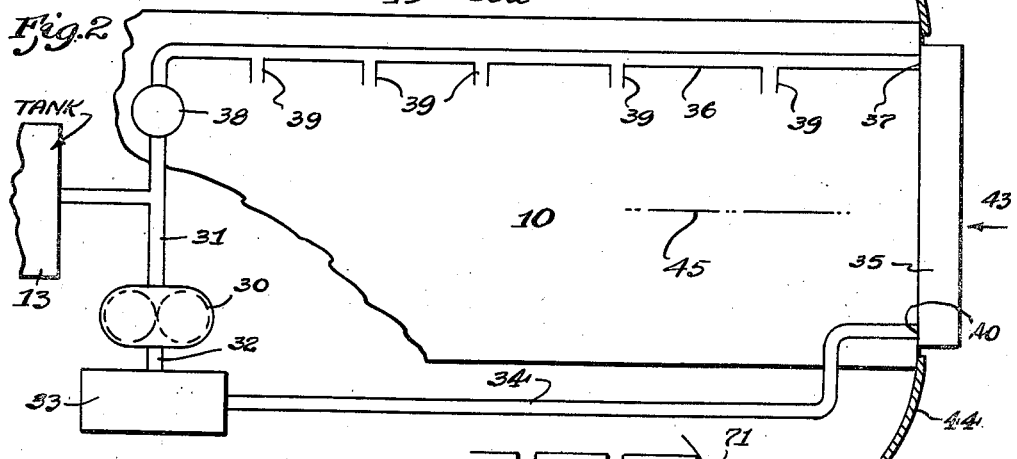
Figures 3, 9:
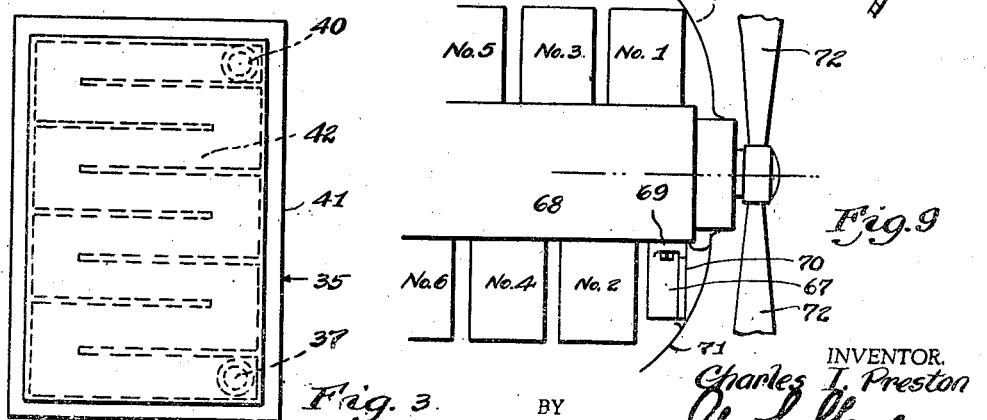

For a more detail understanding of my invention reference may be had to the accompanying drawings illustrating preferred embodiments thereof in which like parts are referred to by like reference characters throughout the several views, and in which:

Fig. 1 is a diagrammatic plan view of an aircraft engine pressure lubrication system, Fig. 2 is a diagrammatic plan view of a modified engine pressure lubrication system, Fig. 3 is an elevational detail view of the oil cooler assembly illustrated in Fig. 2, Fig. 4 is an elevational view of an oil cooler assembly of modified construction, Fig. 5 is a detail sectional view thereof taken substantially on the line 5—5 of Fig. 4, Fig. 6 is a detail sectional view taken on the line 6—6 of Fig. 5, Fig. 7 is a front elevational view of an aircraft engine and illustrating the general assembly of the oil cooler structure therewith.

Fig. 8 is a fragmentary side elevational view of the engine illustrated in Fig. 7 and showing the front end structure, and Fig. 9 is a plan view of an aircraft engine of the opposed cylinder type and illustrating an alternative oil cooler assembly.

The pressure lubrication system described and illustrated has been particularly developed to eliminate difficulties encountered in prior production assemblies, and has for its purpose the provision of means which insure adequate lubrication of engine parts to be lubricated, and embodies an arrangement in which substantially all engine parts to be lubricated are supplied with oil from an oil duct leading directly from the discharge of the oil cooler.

It may be further noted that the system herein illustrated and described embodies an oil cooler assembly secured directly to the engine crankcase thereby eliminating all external oil lines which have a tendency to leak or become broken, and which is arranged for assembly with the engine where same is exposed to a maximum of the air stream to affect efficient heat exchange and maintain the engine lubricating oil at predetermined temperatures to facilitate efficient engine lubrication.

In Figs. 1 and 2 I have diagrammatically illustrated preferred embodiments of my improved pressure lubrication system. Referring more particularly to Fig. 1, the engine 10 is diagrammatically illustrated but it will be understood that for all practical purposes the various ducts which are here shown as lying adjacent to the engine are embodied as internal passages in the engine structure. A fuel pressure pump 11 receives lubricating oil through the inlet connection 12 from the sump or reservoir tank 13, which tank may be a part of the engine or remotely located with respect to the engine. The pump forces lubricating oil through the outlet portion 14, through the strainer 15, and into the oil duct or line 16 which is divided as at 17 into branch ducts 16a and 16b. These branch ducts are connected with an oil cooler 18 secured or fastened adjacent to the front of the engine. The oil flowing through this cooler is thus brought to the desired temperature and is then forced into the return oil duct 19 provided with lateral connections or ducts 20 leading to various engine parts to be lubricated.

Preferably an oil pressure relief valve 21 is incorporated in the return oil duct 19 and is preferably located intermediate the lateral ducts 20 and the fuel pressure pump. It will be noted that the return duct portion 19a preferably connects the relief valve with the intake 12 of the pressure pump 11.

In this construction as illustrated, I preferably provide a front scavenging pump 22 and a rear scavenger pump 23. These pumps, as well as the pressure pump, being driven by the engine by gearing or other suitable driving connections in the customary manner. It will be noted that the front scavenging pump has an intake duct 24 preferably extended to a suitable oil sump at the front of the engine, while the rear scavenging pump has an intake duct 25 preferably extending to a suitable sump at the rear of the engine crankcase. Both of these scavenging pumps discharge into an oil duct or passage 26 which empties into the lubricant tank or reservoir, 13.

Referring to Fig. 2 it will be noted that this system provides a pressure pump 30 connected with an intake duct 31 and an outlet duct 32, said outlet duct leading to an oil filter or strainer 33 from whence the lubricating oil is discharged under pressure to a duct 34 leading to an oil cooler 35 located adjacent the front of the engine and preferably secured thereto as more particularly illustrated in the other figures of the accompanying drawings. The return oil duct 36 connects the oil cooler outlet 37 with the intake oil duct 31 and preferably has incorporated therein an oil pressure relief valve 38, as illustrated. Lateral oil ducts 39 connect this return oil duct 36 with engine parts to be lubricated such as crankshaft bearings, etc.

The oil cooler assembly more particularly illustrated in Fig. 3 shows a construction which includes the intake port 40 adapted to be connected with the oil duct 34 and a casing 41 constructed to provide a tortuous passage 42 for carrying the oil through the oil cooler through the oil outlet port 37. It will be noted that these passages 42 are so arranged as to provide a maximum of heat exchange surface exposed to the air stream flowing against the engine in a direction as indicated by the arrows 43.

It will be observed that the aircraft structure embodies a cowling 44 which encloses the engine and the oil cooler is located to lie substantially flush with the surface of this cowling and to lie in a plane substantially normal to the engine longitudinal axis as indicated by the dot and dash line 45 as well as substantially normal to the flow of air as propelled against the engine by the engine driven propeller (not shown).

Obviously various types of oil cooler constructions may be incorporated in my improved lubrication system, but I find that the most satisfactory results are obtained by employing an oil cooler structure constructed and arranged to be secured directly to the engine structure, but so arranged as to face the air stream which is induced to flow against the engine by the engine driven propeller.

The oil cooler construction illustrated in detail, Figs. 4 to 6 inclusive, embodies a casing 50 having an inlet port 51 and an outlet port 52 which are constructed to respectively register with the engine oil duct 34 and the engine return oil duct 36 in a manner substantially similar to the arrangement illustrated in Figs. 2 and 3 which show the cooler intake port 40 registering with the engine duct 34 and the outlet cooler port 37 registering with the engine return duct 36. The casing 50 is provided with a plurality of radially extending passages 53 connected at their outer ends as at 54 and at their inner ends as at 55 to provide a tortuous passageway for conducting lubricating oil through the oil cooler assembly.

It will be noted by particularly observing Figs. 7 and 8 that the oil cooler is secured directly against an engine pad 60 at the front of the engine crankcase and that this oil cooler is offset with respect to the engine crankshaft axis 61. In the particular construction illustrated in Fig. 7 the oil cooler is secured to the engine crankcase in that region lying below or beneath the engine longitudinal plane 59 containing the cylinder axes and is preferably symmetrically arranged relative to the longitudinal vertical plane 58 of the engine through the engine crankshaft and which lies substantially perpendicular to the first mentioned engine plane. It will thus be noted that this oil cooler assembly may be advantageously located flush with the surface of the engine cowling 44 and preferably lies in a plane extending substantially normal to the air stream as induced to flow against the engine by the engine driven propeller. Obviously this oil cooler assembly is located as far as is reasonably practical from the engine crankshaft axis in order to expose the heat exchange surface of the cooler to a maximum flow of cooling air, and it is further desired to provide an adequate heat exchange surface for obtaining the required and necessary cooling of the lubricating oil changes prior to the introduction of the oil to engine parts to be lubricated.

The above described construction is particularly applicable to an aircraft engine having aligned engine cylinders and particularly with an engine of a horizontal cylinder type. This location of the oil cooler with such engines having a pressure pump located at the rear of the engine is of particular value, as it makes possible the cooling of the oil just prior to the introduction of the lubricating oil to the engine parts to be lubricated and thus insures proper engine lubrication, resulting in improved engine performance.

In some instances it is desirable to attach the oil cooler to the side of the engine crankcase, and in this construction illustrated somewhat diagrammatically in Fig. 9. The oil cooler 67 is secured to the side of the engine crankcase 68, as at 69 and is projected into the space lying adjacent to the engine cylinder number 2 and substantially to the opposite side of the central engine plane from cylinder number 1. This cooler is preferably secured directly to the engine crankcase or to another convenient part of the engine structure and is provided with a heat exchange surface 70 constructed and arranged to lie substantially flush with the engine cowling 71, the plane of this heat exposed surface preferably constructed to face the air stream as introduced to flow against the engine by the engine driven propeller 72 in order to effect an efficient cooling of the lubricating oil flowing through said oil cooler device.

It will be noted that in all instances the important principle of construction is, to wit:

A cooler assembly at the front end of the engine and provided with a heat exchange surface lying substantially flush with respect to the surface of the engine cowling as embodied in the various modified constructions illustrated and described herein.

The above construction is particularly applicable to aircraft internal combustion engines and provides improved operating characteristics and provides a construction of minimum weight and of rugged character in which danger of oil leaks and breaks are minimized.

It will be apparent to those familiar with aircraft engines that the above principles of construction and operation may be modified in some respects without departing from the spirit of my invention or from the scope of the appended claims.

I claim:

1. In a lubrication system for an aircraft internal combustion engine, an engine structure having a plurality of aligned engine cylinders, a crankcase to which said cylinders are secured and having internal oil ducts, and an oil cooler unit comprising a casing secured directly to a front face of said engine crankcase structure and having inlet and outlet ports directly registering respectively with oil openings in the front face of said engine crankcase and which are constructed in direct communication with the internal oil ducts in said engine structure, said exterior surfaces of said oil cooler uniformly exposed to the cooling influences of the air stream flowing against said engine.

2. In a lubrication system for an aircraft internal combustion engine, an engine structure having a plurality of aligned engine cylinders, an engine crankcase structure having internal oil ducts, and an oil cooler unit comprising a casing secured directly to a front face of said engine crankcase structure and having inlet and outlet ports directly registering respectively with oil openings in said engine crankcase front face and which are constructed in direct communication with the internal oil ducts in said engine crankcase structure, said casing consisting of a semi-circular structure adapted for assembly on said engine structure substantially symmetrical relative to the central vertical longitudinal plane of said engine.

3. In a lubrication system for an aircraft internal combustion engine, an engine crankcase structure having internal oil ducts and supporting a plurality of aligned engine cylinders, and an oil cooler unit comprising a casing secured directly to a front face of said engine crankcase structure and having inlet and outlet ports directly registering respectively with oil openings in said engine crankcase front face and which are constructed in direct communication with the internal oil ducts in said engine crankcase structure, said casing consisting of a semi-circular casting adapted for assembly on said engine structure substantially symmetrical relative to the central vertical longitudinal plane of said engine, and secured to that portion of the front face of said engine crankcase structure lying beneath the engine plane containing all said cylinder axes.

4. In a lubrication system for an aircraft internal combustion engine, an engine crankcase structure having internal oil ducts and supporting a plurality of aligned horizontal opposed engine cylinders, and an oil cooler unit comprising a casting secured directly to a front face of said engine crankcase structure and having inlet and outlet ports directly registering respectively with oil openings in said engine crankcase front face and which are constructed in direct communication with the internal oil ducts in said engine crankcase structure, said casing consisting of a semi-circular structure adapted for assembly on said engine structure substantially symmetrical relative to the central vertical longitudinal plane of said engine and secured to that portion of the front face of said engine structure lying beneath the engine plane containing all said cylinder axes.

5. In a lubrication system for an aircraft internal combustion engine, an engine crankcase structure having internal oil ducts and supporting a plurality of aligned engine cylinders, and an oil cooler unit comprising a separate casting secured directly to a front face of said engine crankcase structure and having inlet and outlet ports directly registering respectively with oil openings in said engine crankcase front face and which are constructed in direct communication with the internal oil ducts in said engine crankcase structure, said casting having a plurality of radially extending oil passages constructed and arranged to be interconnected and providing a tortuous oil passage connecting the inlet and outlet ports.

CHARLES I. PRESTON.